(12) United States Patent
Kirkby et al.

(10) Patent No.: US 10,135,897 B2
(45) Date of Patent: Nov. 20, 2018

(54) BACKFILL OF VIDEO STREAM

(71) Applicant: GOOGLE LLC, Mountain View, CA (US)

(72) Inventors: Ronald Loren Kirkby, Burlingame, CA (US); Gregory Rourk Nelson, San Francisco, CA (US); Gregory R. Duffy, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/414,553

(22) Filed: Jan. 24, 2017

(65) Prior Publication Data

US 2017/0201353 A1    Jul. 13, 2017

Related U.S. Application Data

(63) Continuation of application No. 14/948,355, filed on Nov. 22, 2015, now Pat. No. 9,553,910, which is a
(Continued)

(51) Int. Cl.
*H04L 29/06* (2006.01)
*H04L 12/801* (2013.01)
(Continued)

(52) U.S. Cl.
CPC .......... *H04L 65/602* (2013.01); *H04L 1/1877* (2013.01); *H04L 47/193* (2013.01);
(Continued)

(58) Field of Classification Search
CPC ... H04L 65/4015; H04L 65/60; H04L 65/602; H04L 65/607; H04L 65/608; H04L 65/80;
(Continued)

(56) References Cited

U.S. PATENT DOCUMENTS 2,997,935 A    8/1961   Scheffold
3,782,260 A    1/1974   Ettischer et al.
(Continued)

OTHER PUBLICATIONS

0308 Brand USB 2.0 HD Night Vision Webcam Web Cam Camera Webcamera With Microphone Sucker Stand for PC Computer Laptop Notebook, Dec. 18, 2015, 13 pgs.
(Continued)

*Primary Examiner* — Michael C Lai
(74) *Attorney, Agent, or Firm* — Morgan, Lewis & Bockius LLP

(57) ABSTRACT

A data streaming system includes one or more processors, memory, and a circular buffer stored in the memory. The system includes a media loader process that retrieves frames from a media source and writes the retrieved frames in chronological order to the circular buffer. The system includes a forward dispatch process that transmits frames from the circular buffer to a destination server in chronological order in real-time. The system also includes a backfill dispatch process that executes in response to receiving a backfill request from the destination server, transmitting frames from the circular buffer to the destination server in reverse chronological order.

20 Claims, 6 Drawing Sheets

Related U.S. Application Data continuation of application No. 13/733,789, filed on Jan. 3, 2013, now Pat. No. 9,197,686.

(60) Provisional application No. 61/583,997, filed on Jan. 6, 2012.

(51) Int. Cl.
*H04L 12/851* (2013.01)
*H04L 12/835* (2013.01)
*H04L 1/18* (2006.01)
*H04W 4/80* (2018.01)

(52) U.S. Cl.
CPC .......... *H04L 47/2433* (2013.01); *H04L 47/30* (2013.01); *H04L 65/4015* (2013.01); *H04L 65/4069* (2013.01); *H04L 65/60* (2013.01); *H04L 65/607* (2013.01); *H04L 65/608* (2013.01); *H04L 65/80* (2013.01); *H04W 4/80* (2018.02)

(58) Field of Classification Search
CPC . H04L 65/4096; H04L 49/90; H04L 49/9005; H04L 49/9031; H04L 49/9084; H04L 47/30; H04L 47/193; H04L 47/2433; H04L 47/10; H04L 67/1097; H04W 4/008
See application file for complete search history.

(56) References Cited

U.S. PATENT DOCUMENTS

| | | |
|---|---|---|
| D349,914 S | 8/1994 | Usui |
| D357,267 S | 4/1995 | Yotsuya |
| D372,490 S | 8/1996 | Sheffield et al. |
| 5,604,534 A | 2/1997 | Hedges et al. |
| D385,571 S | 10/1997 | Abrams |
| 5,862,428 A | 1/1999 | An |
| 5,963,253 A | 10/1999 | Dwyer |
| 5,978,028 A | 11/1999 | Yamane |
| 5,995,273 A | 11/1999 | Chandrasekhar |
| 6,033,592 A | 3/2000 | Chandrasekhar |
| 6,088,470 A | 7/2000 | Camus et al. |
| D429,269 S | 8/2000 | Renkis |
| D429,743 S | 8/2000 | Renkis |
| 6,141,052 A | 10/2000 | Fukumitsu |
| 6,147,701 A | 11/2000 | Tamura et al. |
| D442,202 S | 5/2001 | Pfeifer |
| D445,123 S | 7/2001 | Shen |
| 6,268,882 B1 | 7/2001 | Elberbaum |
| D446,534 S | 8/2001 | Zimmer |
| 6,271,752 B1 | 8/2001 | Vaios |
| D447,758 S | 9/2001 | Lin et al. |
| D449,630 S | 10/2001 | Rak et al. |
| D452,259 S | 12/2001 | Choi |
| 6,357,936 B1 | 3/2002 | Elberbaum |
| D455,164 S | 4/2002 | Tsang et al. |
| 6,462,781 B1 | 10/2002 | Arnold |
| D467,952 S | 12/2002 | Nakamura |
| D469,775 S | 2/2003 | Bradley |
| D470,874 S | 2/2003 | Chiu |
| D470,875 S | 2/2003 | Liao |
| 6,515,275 B1 | 2/2003 | Hunter et al. |
| 6,634,804 B1 | 10/2003 | Toste et al. |
| 6,650,694 B1 * | 11/2003 | Brown .................... G06F 17/15 370/342 |
| 6,678,001 B1 | 1/2004 | Elberbaum |
| 6,714,236 B1 | 3/2004 | Wada |
| 6,714,286 B1 | 3/2004 | Wheel |
| 6,727,954 B1 | 4/2004 | Okada et al. |
| D489,388 S | 5/2004 | Saito et al. |
| 6,762,790 B1 | 7/2004 | Matko et al. |
| D511,352 S | 11/2005 | Oliver et al. |
| 7,034,884 B2 | 4/2006 | Misawa |
| 7,066,664 B1 | 6/2006 | Sitoh et al. |
| 7,076,162 B2 | 7/2006 | Yamashita |
| D527,755 S | 9/2006 | Wu |
| 7,151,565 B1 | 12/2006 | Wada |
| D534,938 S | 1/2007 | Beasley et al. |
| D537,097 S | 2/2007 | Freeman |
| D542,320 S | 5/2007 | Cheng |
| D552,649 S | 10/2007 | Logan et al. |
| D552,659 S | 10/2007 | Stephens et al. |
| D555,692 S | 11/2007 | Liu et al. |
| 7,290,740 B2 | 11/2007 | Joy et al. |
| D558,250 S | 12/2007 | Hsia |
| D563,446 S | 3/2008 | Stephens et al. |
| D575,316 S | 8/2008 | Liu et al. |
| 7,443,446 B2 | 10/2008 | Seo |
| 7,552,340 B2 | 6/2009 | Ooi et al. |
| 7,586,537 B2 | 9/2009 | Konishi et al. |
| D606,105 S | 12/2009 | Hinkel |
| 7,646,425 B2 | 1/2010 | Bohaker et al. |
| D610,601 S | 2/2010 | Melder |
| D614,223 S | 4/2010 | Kim et al. |
| 7,705,882 B2 | 4/2010 | Engel et al. |
| D627,815 S | 11/2010 | Oba |
| D628,223 S | 11/2010 | Kao |
| 7,930,369 B2 | 4/2011 | Marriott et al. |
| D638,461 S | 5/2011 | Kim et al. |
| 7,986,369 B1 | 7/2011 | Burns |
| D648,766 S | 11/2011 | Chen |
| D651,229 S | 12/2011 | Tan et al. |
| D651,230 S | 12/2011 | Tan et al. |
| 8,072,536 B1 | 12/2011 | Campbell |
| D651,633 S | 1/2012 | Park et al. |
| 8,139,122 B2 | 3/2012 | Rolston |
| D657,410 S | 4/2012 | Helaoui et al. |
| 8,165,146 B1 | 4/2012 | Melick et al. |
| 8,174,972 B2 | 5/2012 | Cernius et al. |
| 8,359,622 B1 | 1/2013 | Everson et al. |
| D678,929 S | 3/2013 | Hancock |
| 8,402,145 B2 | 3/2013 | Holden et al. |
| 8,432,485 B1 | 4/2013 | Martinez et al. |
| D687,085 S | 7/2013 | Manson |
| 8,504,707 B2 | 8/2013 | Toebes et al. |
| D694,305 S | 11/2013 | Katori et al. |
| D697,119 S | 1/2014 | Park et al. |
| 8,625,024 B2 | 1/2014 | Hsu |
| D700,232 S | 2/2014 | Ramsay |
| D719,205 S | 12/2014 | Matsumoto |
| D729,296 S | 5/2015 | Shelton |
| D730,422 S | 5/2015 | Kim et al. |
| 9,071,740 B1 | 6/2015 | Duffy et al. |
| D733,781 S | 7/2015 | Chen |
| D734,801 S | 7/2015 | Yang |
| 9,102,055 B1 | 8/2015 | Konolige et al. |
| D740,871 S | 10/2015 | Moon et al. |
| D742,954 S | 11/2015 | Simonelli et al. |
| D743,465 S | 11/2015 | Aglassinger et al. |
| D745,916 S | 12/2015 | Oh |
| D746,350 S | 12/2015 | Li |
| D748,709 S | 2/2016 | Jeong |
| D755,880 S | 5/2016 | Luo et al. |
| 9,330,307 B2 | 5/2016 | Litvak et al. |
| 9,386,230 B1 | 7/2016 | Duran et al. |
| 9,544,485 B2 | 1/2017 | Conner et al. |
| 9,838,602 B2 | 12/2017 | Duran et al. |
| 9,866,760 B2 | 1/2018 | Dorai et al. |
| 9,875,718 B1 | 1/2018 | Basehore et al. |
| 2001/0015760 A1 | 8/2001 | Fellegara et al. |
| 2001/0022550 A1 | 9/2001 | Steffel |
| 2002/0003575 A1 | 1/2002 | Marchese |
| 2002/0056794 A1 | 5/2002 | Ibrahim |
| 2002/0107591 A1 | 8/2002 | Gabai et al. |
| 2002/0141418 A1 | 10/2002 | Ben-Dor et al. |
| 2002/0159270 A1 | 10/2002 | Lynam et al. |
| 2002/0186317 A1 | 12/2002 | Kayanuma |
| 2002/0191082 A1 | 12/2002 | Fujino et al. |
| 2003/0164881 A1 | 9/2003 | Ohe et al. |
| 2003/0169354 A1 | 9/2003 | Aotsuka |
| 2003/0193409 A1* | 10/2003 | Crank ................ B64D 45/0015 340/970 |
| 2003/0216151 A1 | 11/2003 | Kitano et al. |

(56) References Cited

U.S. PATENT DOCUMENTS

| | | |
|---|---|---|
| 2004/0132489 A1 | 7/2004 | Ryley et al. |
| 2004/0211868 A1 | 10/2004 | Holmes et al. |
| 2004/0246341 A1 | 12/2004 | Lee et al. |
| 2004/0247203 A1 | 12/2004 | Dell'Eva |
| 2005/0062720 A1 | 3/2005 | Rotzoll et al. |
| 2005/0073575 A1 | 4/2005 | Thacher et al. |
| 2005/0088537 A1 | 4/2005 | Nakamura et al. |
| 2005/0128336 A1 | 6/2005 | Toledano et al. |
| 2005/0146792 A1 | 7/2005 | Schofield et al. |
| 2005/0149213 A1 | 7/2005 | Guzak et al. |
| 2005/0151042 A1 | 7/2005 | Watson |
| 2005/0200751 A1 | 9/2005 | Weaver |
| 2005/0212958 A1 | 9/2005 | Su et al. |
| 2005/0227217 A1 | 10/2005 | Wilson |
| 2005/0230583 A1 | 10/2005 | Wu |
| 2005/0237425 A1 | 10/2005 | Lee et al. |
| 2005/0243022 A1 | 11/2005 | Negru |
| 2005/0243199 A1 | 11/2005 | Bohaker et al. |
| 2005/0275723 A1 | 12/2005 | Sablak et al. |
| 2006/0017842 A1 | 1/2006 | Jun |
| 2006/0024046 A1 | 2/2006 | Jones |
| 2006/0086871 A1 | 4/2006 | Joseph et al. |
| 2006/0109375 A1 | 5/2006 | Ho et al. |
| 2006/0109613 A1 | 5/2006 | Chen |
| 2006/0123129 A1 | 6/2006 | Toebes et al. |
| 2006/0123166 A1 | 6/2006 | Toebes et al. |
| 2006/0210259 A1 | 9/2006 | Matsumoto |
| 2006/0238707 A1 | 10/2006 | Elvesjo et al. |
| 2006/0244583 A1 | 11/2006 | Kawada |
| 2006/0262194 A1 | 11/2006 | Swain |
| 2006/0282866 A1 | 12/2006 | Kuo |
| 2007/0001087 A1 | 1/2007 | Shyu et al. |
| 2007/0011375 A1 | 1/2007 | Kumar |
| 2007/0036539 A1 | 2/2007 | Martinez et al. |
| 2007/0050828 A1 | 3/2007 | Renzi et al. |
| 2007/0083791 A1* | 4/2007 | Panesar ............... G06F 13/4286 714/18 |
| 2007/0222888 A1 | 9/2007 | Xiao et al. |
| 2008/0001547 A1 | 1/2008 | Negru |
| 2008/0005432 A1 | 1/2008 | Kagawa |
| 2008/0012980 A1 | 1/2008 | Yamane |
| 2008/0031161 A1* | 2/2008 | Osthus .................... H04N 7/152 370/261 |
| 2008/0056709 A1 | 3/2008 | Huang et al. |
| 2008/0074535 A1 | 3/2008 | Ohsuga |
| 2008/0151052 A1 | 6/2008 | Erel et al. |
| 2008/0152218 A1 | 6/2008 | Okada |
| 2008/0186150 A1 | 8/2008 | Kao |
| 2008/0189352 A1* | 8/2008 | Mitchell ................ G06F 9/542 709/201 |
| 2008/0231699 A1 | 9/2008 | Konishi et al. |
| 2008/0291260 A1 | 11/2008 | Dignan et al. |
| 2008/0309765 A1 | 12/2008 | Dayan et al. |
| 2009/0019187 A1 | 1/2009 | Okuma |
| 2009/0027570 A1* | 1/2009 | Fujinawa ............... G03B 21/16 348/744 |
| 2009/0069633 A1 | 3/2009 | Orihara et al. |
| 2009/0102715 A1* | 4/2009 | Lou ....................... H04B 7/0413 342/372 |
| 2009/0141918 A1 | 6/2009 | Chris et al. |
| 2009/0141939 A1 | 6/2009 | Chambers et al. |
| 2009/0158373 A1* | 6/2009 | Belz ................... H04N 7/17318 725/114 |
| 2009/0175612 A1 | 7/2009 | Wen |
| 2009/0195655 A1 | 8/2009 | Pandey |
| 2009/0245268 A1 | 10/2009 | Pugliese, IV |
| 2009/0248918 A1 | 10/2009 | Diab et al. |
| 2009/0289921 A1 | 11/2009 | Mickelson et al. |
| 2009/0296735 A1 | 12/2009 | Cernius et al. |
| 2009/0309969 A1 | 12/2009 | Wendler |
| 2010/0026811 A1 | 2/2010 | Palmer |
| 2010/0039253 A1 | 2/2010 | Zang |
| 2010/0076600 A1 | 3/2010 | Cross et al. |
| 2010/0085749 A1 | 4/2010 | Bezgachev |
| 2010/0109878 A1 | 5/2010 | Desrosiers |
| 2010/0180012 A1* | 7/2010 | Heo ....................... H04L 65/601 709/219 |
| 2010/0199157 A1* | 8/2010 | Takaoka ............... H04L 1/1819 714/800 |
| 2010/0271503 A1 | 10/2010 | Safaee-Rad et al. |
| 2010/0306399 A1 | 12/2010 | Khosravi et al. |
| 2010/0314508 A1 | 12/2010 | Bevirt et al. |
| 2010/0328475 A1 | 12/2010 | Thomas et al. |
| 2010/0330843 A1 | 12/2010 | Gao et al. |
| 2011/0007159 A1 | 1/2011 | Camp et al. |
| 2011/0102438 A1 | 5/2011 | Mathe et al. |
| 2011/0102588 A1 | 5/2011 | Trundle et al. |
| 2011/0134243 A1 | 6/2011 | Siann et al. |
| 2011/0134313 A1 | 6/2011 | Kato |
| 2011/0158637 A1 | 6/2011 | Jung |
| 2011/0161076 A1 | 6/2011 | Davis et al. |
| 2011/0193964 A1 | 8/2011 | McLeod |
| 2011/0193967 A1 | 8/2011 | Matsumoto et al. |
| 2011/0205965 A1 | 8/2011 | Sprigg et al. |
| 2011/0231903 A1* | 9/2011 | Springer ................ G06F 21/31 726/3 |
| 2011/0234803 A1 | 9/2011 | Nakajima et al. |
| 2011/0255289 A1 | 10/2011 | Krah |
| 2011/0267492 A1 | 11/2011 | Prentice et al. |
| 2011/0285813 A1 | 11/2011 | Girdzijauskas et al. |
| 2011/0293137 A1 | 12/2011 | Gurman et al. |
| 2011/0299728 A1 | 12/2011 | Markovic et al. |
| 2012/0004956 A1* | 1/2012 | Huston ................ G06Q 30/0207 705/14.1 |
| 2012/0026325 A1 | 2/2012 | Bunker et al. |
| 2012/0081009 A1 | 4/2012 | Shteynberg |
| 2012/0086815 A1* | 4/2012 | Cooper ..................... H04N 7/15 348/207.1 |
| 2012/0105632 A1 | 5/2012 | Renkis |
| 2012/0106037 A1 | 5/2012 | Diebel et al. |
| 2012/0127270 A1 | 5/2012 | Zhang et al. |
| 2012/0140068 A1 | 6/2012 | Monroe et al. |
| 2012/0162416 A1 | 6/2012 | Su et al. |
| 2012/0194650 A1 | 8/2012 | Izadi et al. |
| 2012/0236373 A1 | 9/2012 | Oyama |
| 2012/0246359 A1 | 9/2012 | Scragg, Jr. et al. |
| 2012/0262575 A1 | 10/2012 | Champagne et al. |
| 2012/0263450 A1 | 10/2012 | Totani |
| 2012/0311686 A1 | 12/2012 | Medina et al. |
| 2012/0328259 A1 | 12/2012 | Seibert, Jr. et al. |
| 2012/0328358 A1 | 12/2012 | Akiyama |
| 2013/0007099 A1 | 1/2013 | Lee et al. |
| 2013/0053657 A1 | 2/2013 | Ziarno et al. |
| 2013/0156260 A1 | 6/2013 | Craig |
| 2013/0162629 A1 | 6/2013 | Huang et al. |
| 2013/0314544 A1 | 11/2013 | Ban |
| 2013/0321564 A1 | 12/2013 | Smith et al. |
| 2013/0342653 A1 | 12/2013 | McCloskey et al. |
| 2014/0032796 A1 | 1/2014 | Krause |
| 2014/0047143 A1 | 2/2014 | Bateman et al. |
| 2014/0049609 A1 | 2/2014 | Wilson et al. |
| 2014/0119604 A1 | 5/2014 | Mai et al. |
| 2014/0168421 A1 | 6/2014 | Xu et al. |
| 2014/0241387 A1 | 8/2014 | Ortiz |
| 2014/0267874 A1 | 9/2014 | Ratcliff et al. |
| 2014/0270387 A1 | 9/2014 | Hoof et al. |
| 2014/0333726 A1 | 11/2014 | Tokui et al. |
| 2014/0375635 A1 | 12/2014 | Johnson et al. |
| 2015/0049324 A1 | 2/2015 | Tan et al. |
| 2015/0052029 A1 | 2/2015 | Wu et al. |
| 2015/0120389 A1 | 4/2015 | Zhang et al. |
| 2015/0154467 A1 | 6/2015 | Feng et al. |
| 2015/0170371 A1 | 6/2015 | Muninder et al. |
| 2015/0181198 A1 | 6/2015 | Baele et al. |
| 2015/0228114 A1 | 8/2015 | Shapira et al. |
| 2016/0012588 A1 | 1/2016 | Taguchi et al. |
| 2016/0022181 A1 | 1/2016 | Valsan et al. |
| 2016/0029102 A1 | 1/2016 | Daily |
| 2016/0094763 A1 | 3/2016 | Patel |
| 2016/0094829 A1 | 3/2016 | Georgiev et al. |
| 2016/0142681 A1 | 5/2016 | Yu et al. |
| 2016/0205318 A1 | 7/2016 | Wang et al. |

(56) References Cited

U.S. PATENT DOCUMENTS

2016/0261829 A1 9/2016 Olsson
2017/0343801 A1 11/2017 Dabic et al.
2018/0052376 A1 2/2018 Burrows et al.

OTHER PUBLICATIONS

720p TF Card IP Wireless Camera Indoor Built-In Microphone Support Two Way Intercom for Smart Home Life and Unique PIR Alarm, Dec. 18, 2015, 3 pgs.
Adipranata, Fast method for multiple human face segmentation in color image, 2008 Second Int'l Conference on Future Generation Communcation and Networking, IEEE, 2008, 4 pgs.
Buy Svb Ladybird Tripod Webcam 4 Mega Pixel—4 Megapixel Web Cam Online, Best Prices in India: Rediff Shopping, Dec. 16, 2015, 3 pgs.
Drivers—Video Cam: Download Drivers for (Genius VideoCAM NB) Visual/Video Camera, Computer Question Help, Jul. 3, 2008, 2 pgs.
Ebay, Belkin F7D7601AU, Net Cam IP WIFI Baby Pet Monitor Camera Security Night Vision, Dec. 15, 2015, 5 pgs.
Ebay, Lot of 2 USB WebCam Web Cam Camera Logitech Quickcam HP Hewlett Packard, Dec. 16, 2015, 3 pgs.
Ebay, Motorola, MBP421 Digital Video & Sound Rechargeable Baby Monitor 1.8" LCD Screen, Dec. 15, 2015, 5 pgs.
Ebay, New Smallest Mini Camera Camcorder Video Recorder DVR Spy Hidden Pinhole Web Cam, Dec. 2, 2015, 4 pgs.
FabulaTech, What is USB for Remote Desktop, Dec. 12, 2011, 2 pgs, http://web.archive.org/web/20111212070644/http://www.usb-over-network.com/usb-for-remote-desktop.html.
FabulaTech, What is USB over Network, Dec. 17, 2011, 2 pgs, http://web.archive.org/web/20111217080253/http://vvww.usb-over-network.com/usb-over-network.html.
Goods in Stock PC Camera USB Plug and Play Free Driver Digital Webcam Stand Web Camera, Dec. 18, 2015, 12 pgs.
Hampapur, Smart surveillance: applications, technologies and implications, Information Communications and Signal Processing 2, 2003, pp. 1133-1138.
Heo, Fusion of visual and thermal face recognition techniques: A comparative study. Univ. of Tennessee, Knoxville, TN, 2003, 75 pgs.
Input Devices on Pintrest, Computers, Mice and Apples, Tanna Darty, Dec. 15, 2015, 1 pg.
Ion Camera, The Home Pro Wi-Fi Wireless Cloud Video Monitoring Security Camera (Black): Camera & Photo, Dec. 15, 2015, 6 pgs.
Joel Johnson, Glowdoodle Turns Your Crappy Webcam in a Crappier Webcam (in a good way), webcam—Boing Being, Dec. 16, 2015, 8 pgs.
John Lewis, Samsung SEB-1019RW Add-On Night Vision Baby Monitor Camera, Dec. 15, 2015, 2 pgs.
Kyo-Tux, IconArchive, Device WebCam Icon, Phuzion Iconset, Jun. 8, 2010, 3 pgs.
Linksys Wireless-N Internet Home Monitoring Camera: Home Security Systems: Camera & Photo, Amazon.com, Dec. 15, 2015, 7 pgs.
Logi Circle: Portable Home Surveillance Camera from Logitech (video), AppleApple.Top World News, Feb. 10, 2015, 5 pgs.
Mini Universal Tripod Stand for Digital Camera and Webcam A33-in Tripods from Consumer Electronics on Aliexpress.com, Alibaba Group, Store: Angel One-Stop Shopping Center, Dec. 16, 2015, 3 pgs.
Parent, Android USB Port Forwarding, Dec. 26, 2011, 7 pgs, http://www.codeproject.com/Articles/191930/Android-Usb-Port-Forwarding.
Restore.Solutions, Numus Software, USB/VID, Syntek Web Cam Device Drivers, Dec. 12, 2015, 10 pgs.
Silberman, Indoor Segmentation and Support Ingerence from RGBD Images, Computer Vision—ECCV 2012, Springer Berlin Heidelbert, Oct. 2012, pp. 746-780.
Siv Al-Ball Very Small Hidden IP Network Camera Battery Powered Wireless IP Camera, Alibaba.com, 1999-2015, 7 pgs.
TechAllianz, How to Pick the Right Webcam, Satyakam, Jan. 22, 2013, 4 pgs.
Trek Ai-Ball Mini WiFi Spy Cam IP Wireless Camera for Iphone / Android /Ipad, Tmart, www.tmart.com, Dec. 18, 2015, 6 pgs.
Tripod Support for a QuickCam (or other webcam), Instructables, 2015, 3 pgs.
USB/IP Project, USB Request Over IP Network, Dec. 27, 2011, 5 pgs, http://web.archive.org/web/20111227171215/http://usbip.sourceforge.net/.
Web Camera 6 Stock Photo, Dreamstime, Dec. 16, 2015, 2 pgs.
Google, WO/ PCT/US2016/034462, International Preliminary Report on Patentability, dated Nov. 28, 2017, 8 pgs.
Google LLC, International Preliminary Report on Patentability/ Written Opinion, PCT/US2016/037069, dated Dec. 12, 2017, 7 pgs.

\* cited by examiner

BACKFILL OF VIDEO STREAM

CROSS REFERENCE TO RELATED APPLICATIONS

This application is a continuation of U.S. patent application Ser. No. 14/948,355, filed Nov. 22, 2015, entitled "Backfill of Video Stream," (now U.S. Pat. No. 9,553,910), which is a continuation of U.S. patent application Ser. No. 13/733,789, filed Jan. 3, 2013, entitled "Backfill of Video Stream" (now U.S. Pat. No. 9,197,686), which claims priority to U.S. Provisional Patent Application No. 61/583,997, filed Jan. 6, 2012, entitled "Backfill of Video Stream," each of which is incorporated herein by reference in its entirety.

BACKGROUND

In recent years, network-based video streaming devices such as Wi-Fi-enabled security monitor cameras have been developed which streams recorded data in real time to servers via network connections. Network connections, in particular wireless connections (e.g., Wi-Fi), can be easily interrupted. When the network connection between a streaming device and the server is disrupted, there can be loss of data. Solutions are needed to recover the lost data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data streaming is described. In some embodiments, a first media data stream is sent to a destination. In the event that it is detected that a portion of the first media data stream needs to be resent (e.g., the portion is not received by the destination due to network failure or the like), buffered data is sent in a second media data stream, where the buffered data. corresponds to at least some of the missing portion. The buffered data is backfilled. In other words, in the second media data stream, data that is obtained (e.g., recorded) more recently is sent prior to media data that is obtained less recently. Although video streaming is described in the following examples for purposes of illustration, the technique is also applicable to other types of streaming media such as audio.

Figure 1:
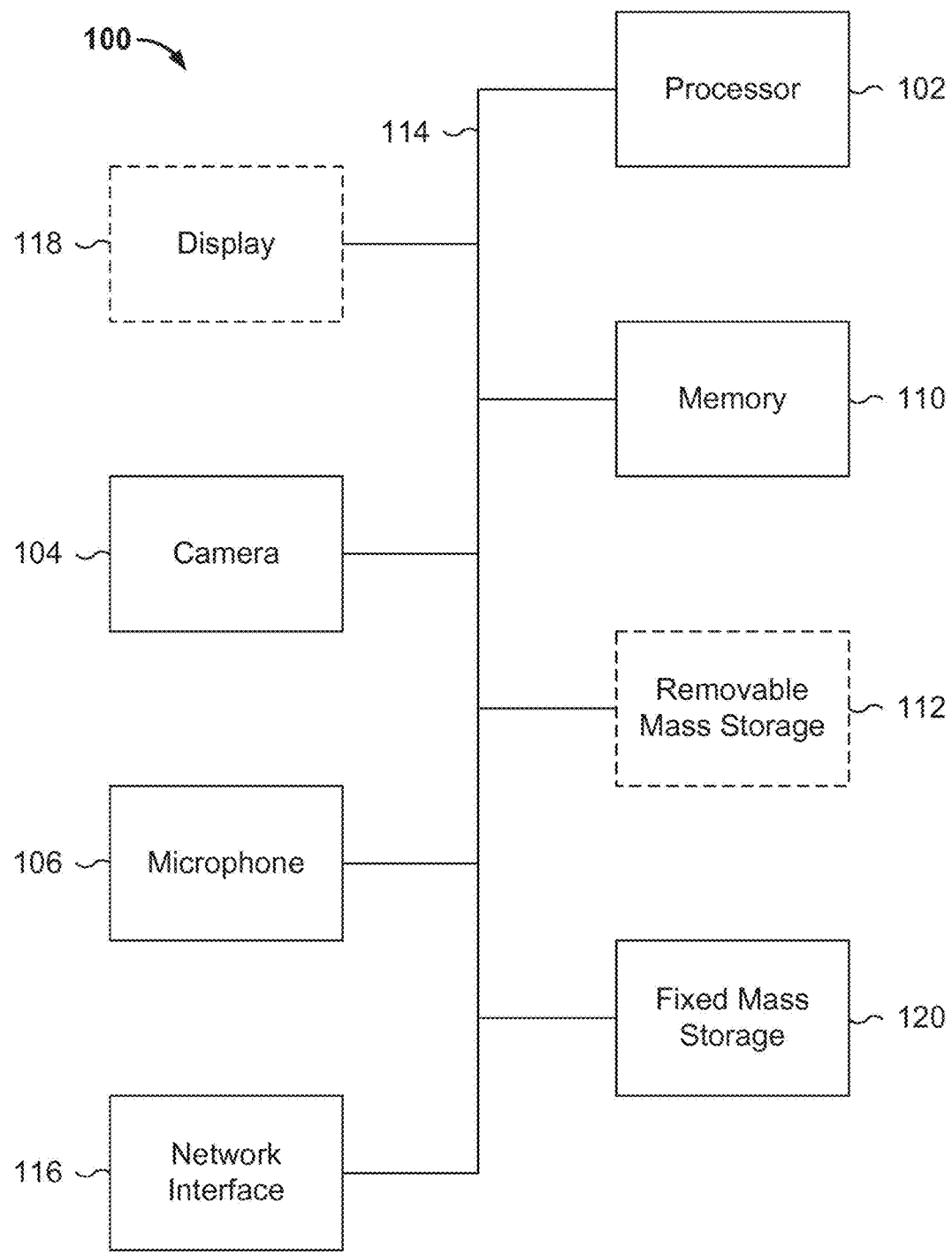
FIG. 1 is a functional diagram illustrating a system for streaming media data in accordance with some embodiments.

FIG. 1 is a functional diagram illustrating a system for streaming media data in accordance with some embodiments. An example of system 102 is the Dropcam® Wi-Fi Internet Video Camera System 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of system 100. Using instructions retrieved from memory 110, the processor 102 controls the reception and manipulation of input data (e.g., recorded media data), and the output of data via an I/O interface (e.g., network interface 116)

Processor 102 is coupled bi-directionally with memory 110, which can include primary storages such as a random access memory (RAM) and/or a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

An optional removable mass storage device 112 provides additional data storage capacity for the system 100, and is coupled either bi-directionally (read/write) or uni-directionally (read only) to processor 102. An optional fixed mass storage 120 can also, for example, provide additional data storage capacity. Examples of mass storage 120 include a hard disk drive, a flash drive, a solid state drive, or the like. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a network interface (also referred to as the communication interface) 116, a microphone 106, a camera 104, as well as any optional auxiliary input/output interface devices such as a display 118, a keyboard and a pointing device, a sound card, speakers, (not shown) and other subsystems as needed.

The network interface 116 allows processor 102 to be coupled to another computer, computer network, or telecommunications network using a network connection (e.g., an Ethernet connection, a Wi-Fi connection, etc.). For example, through the network interface 116, the processor 102 can send streaming media data (including audio and/or video) to another device such as a media server. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed over a direct connection such as a Universal Serial Bus (USB) interface or over a network such as the Internet, intranet networks, or local area networks, in conjunction with a remote processor that shares a portion of the processing. Additional mass storage devices (not shown) can also be connected to processor 102 through network interface 116.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
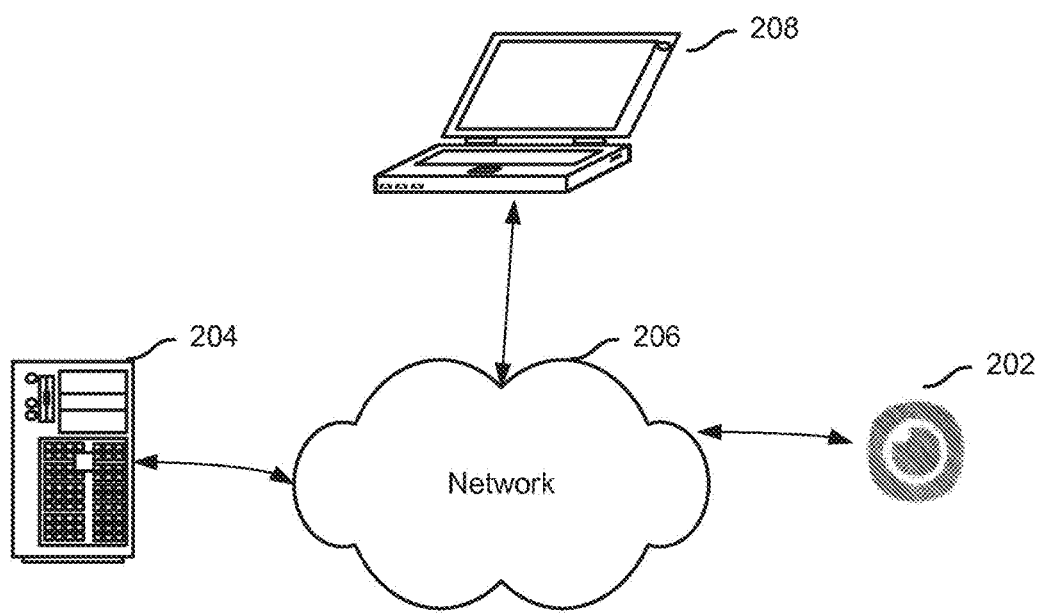
FIG. 2 is a block diagram illustrating an embodiment of a network-enabled media capturing and streaming platform.

FIG. 2 is a block diagram illustrating an embodiment of a network-enabled media capturing and streaming platform. Device 202 can be implemented by a system such as 100 or by any other appropriate recording and streaming device. An example of device 202 is the Dropcam®, Wi-Fi Internet Video Camera. Device 202 includes one or more interfaces configured to capture media data (e.g., camera and/or microphone interfaces configured to capture video and/or audio), and record the captured media information to a local storage. The device includes one or more network interfaces that allow the device to be connected to a server 204 via a network 206 such as the Internet. Alternatively, device 202 can also connect to the server via an external host. For example, device 202 can be connected to a host via a USB, Bluetooth, or other local connections, and use the host as a proxy for communicating with the server over the network.

In some embodiments, device 202 is configured to continuously capture video and stream the video to server 204 via the network, using a protocol such as Real Time Streaming Protocol (RTSP), DropTalk, or any other appropriate streaming protocol. Server 204 (also referred to as a media server) buffers the received video stream, saves it to storage, and makes it available for viewing by a user. For example, the server can make the video available to a client device by implementing a client-server communications protocol such as Hypertext Transfer Protocol (HTTP), where the video is accessible at a given Universal Resource Locator (URL). user accesses the video by visiting the URL using a web browser or a standalone application running on a client device 208 (e.g., a personal computer, a smartphone, a tablet device, or the like). The user can view the video live, i.e., in real time as the video is captured and streamed to the server by the device, or view previously recorded video. A user interface with time indication (e.g., a scrubber bar) is provided for the user via the web browser or the standalone application to control the portion of the video to view.

In some embodiments, while the video is being captured, it is also buffered in a local storage space (e.g., a disk, a flash drive, or other memory device) that is a part of the device. The amount of video that is buffered depends on the quality of the video being stored and the amount of storage space available. In some embodiments, a few minutes or a few hours' worth of video is buffered. In some embodiments, the storage space is implemented as a circular buffer in which the oldest video content is overwritten by the newest video content when the storage space is filled up and additional space is needed.

Figure 3A:
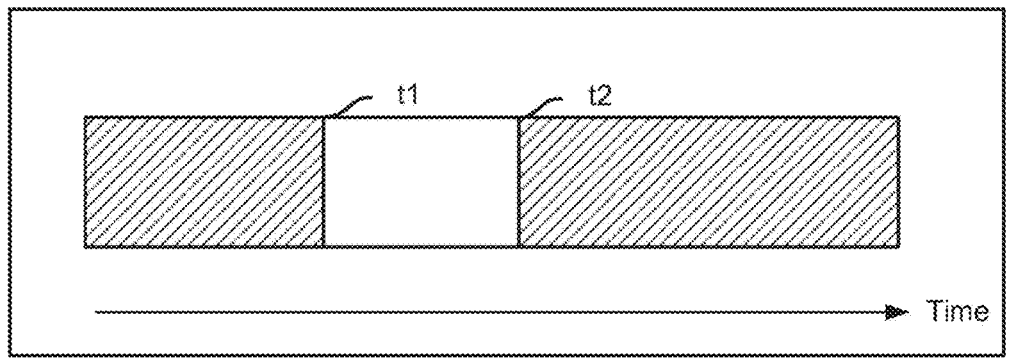
FIG. 3A is a diagram illustrating an example representation of the available video data.

If there is disruption in the device's video stream to the server, some of the video data will not be correctly received by the server. For example, if the network connection is disrupted temporarily, the device will not be able to access the server via the Internet, causing disruption to the video stream. FIG. 3A is a diagram illustrating an example representation of the available video data. Information conveyed in the example shown may be implemented as data structures or as a user interface displayed to the user. The x-axis represents time. The shaded portions represent available video data, and in particular available video data on the server. In some embodiments, the video data is stored as a Motion Picture Experts Group (MPEG) stream comprising a plurality of video frames with timestamps. Between time t1 and t2, there is a gap where the video stream is disrupted (possibly due to a network outage or the like). Without any backfill, the user will simply not be able to view the video captured between t1 and t2. To overcome the problem, in some embodiments, the video that is buffered on the camera itself is used to backfill the gap once the network connection is restored.

Figure 3B:
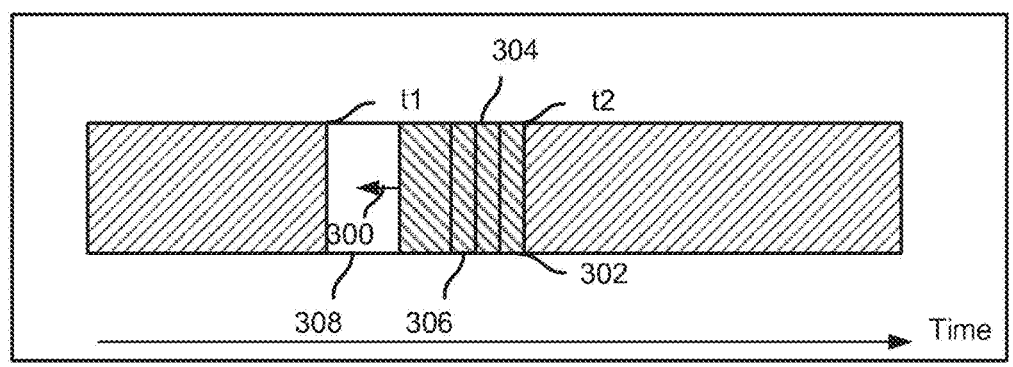
FIG. 3B illustrates an example where backfill is taking place. In this case, data is resent in the opposite direction of the time axis along arrow 300.

In this example, the video stream includes timestamps so that the data on the device and the data on the server can be synchronized. After the disruption has occurred and the connection is restored, the server will request the device to reseed the missing portion of video in an attempt to backfill the video. FIG. 3B illustrates an example where backfill is taking place. In this case, data is resent in the opposite direction of the time axis along arrow 300. In other words, data that was recorded more recently is resent before data that was recorded earlier. For example, video frame 302 (with a timestarnp of 00:00:30) is resent before video frame 304 (with a timestamp of 00:00:29), which in turn is resent before video frame 306 (with a timestamp of 00:00:28).

One reason to backfill in the opposite direction of the time axis is that the camera is still recording live video and may be overwriting old data in the buffer. A backfill process that goes in the opposite direction of the time axis means that there may be a gap of lost data at the beginning of the disruption period (e.g., portion 308) that has already been overwritten by new data, but the portion of missing data that is resent would be continuous. If the process were to resend data in the same direction as the time axis, there can be portions of the old data that are not yet uploaded on to the server but is overwritten by new data and becomes irretrievably lost. Depending on the speed of the overwrite and the speed of the upload, there can be multiple such missing data portions, resulting in a backfilled stream that is choppy and is unpleasant to the viewer.

Figure 3C:
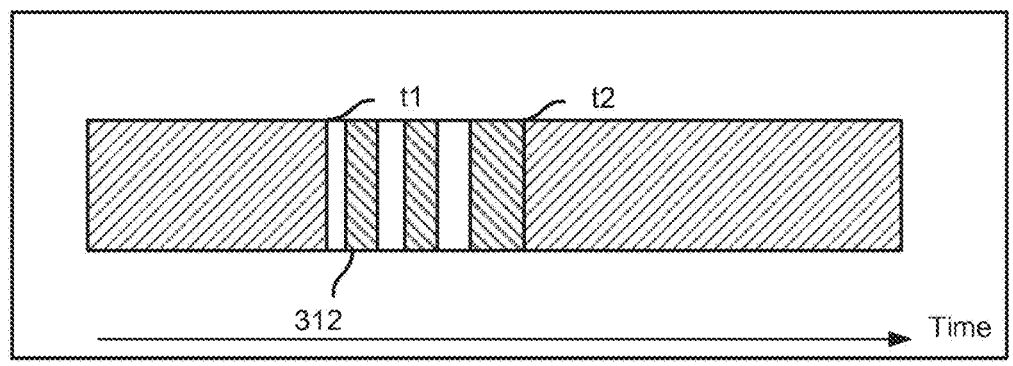
FIG. 3C is a diagram illustrating the effect of a process that sends data in the same direction as the time axis.

FIG. 3C is a diagram illustrating the effect of a process that sends data in the same direction as the time axis. As shown, recorded data is written continuously to a circular buffer, and old data can be overwritten by new data. To resend the portion of data between t1-t2, data is resent in the same direction as the time axis. The portions shown in white correspond to portions of the buffered data that have been overwritten by newer data and therefore cannot be resent. Hashed portions such as 312 are resent before the buffer is overwritten by new data. The overall effect of the resent stream is choppy because of the discontinuities.

Figure 4:
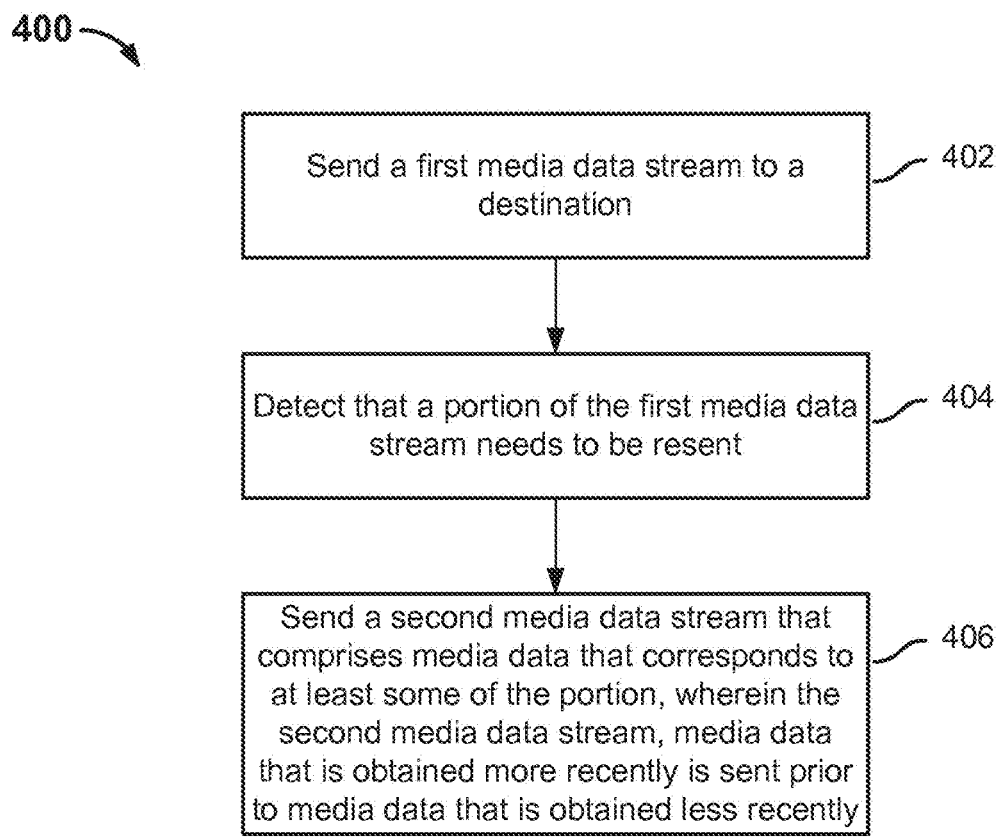
FIG. 4 is a flowchart illustrating an embodiment of a process for back filling streaming media data.

FIG. 4 is a flowchart illustrating an embodiment of a process for back filling streaming media data. Process 400 can be performed on a device such as 100. At 402, a first media data stream is sent to a destination such as a video server. In some embodiments, the first media data stream includes a recorded video stream. In some embodiments, the recorded video stream is captured in real-time by the device.

The first media data stream is written to a local storage (e.g., a mass storage component such as 112 or 120 of FIG. I) continuously as the media data is captured. As will be described in greater detail below, in some embodiments, the local storage is implemented using a circular buffer.

At 404, it is detected that a portion of the first media data stream needs to be resent. Details of an example process for how to detect the missing portion is described below in connection with FIG. 5.

At 406, a second media data stream that comprises media data corresponding to at least some of the missing portion is sent to the destination. In some embodiments, once the processor on the device detects that a portion of the media stream needs to be resent, the processor notifies the communications interface and causes appropriate data to be transferred from a storage buffer to the communications interface, which sends the missing portion to the destination. Media data that is obtained more recently is sent prior to media data that is obtained less recently. Referring to FIG. 3B, data frame 302, which is obtained more recently than data frame 304, is sent before data frame 304.

In some embodiments, the second media data stream is generated by reading the recorded media data from the local storage. The device continues to send media data that corresponds to the missing portion until either the entire missing portion has been sent, or newer data that is recorded after the end of the disrupted period (e.g., data recorded after time t2) is encountered.

Upon receiving the resent media data, the server stores the media data. Since the media data is sequenced according to the frame identifiers, the missing portion can now be played back properly.

Figure 5:
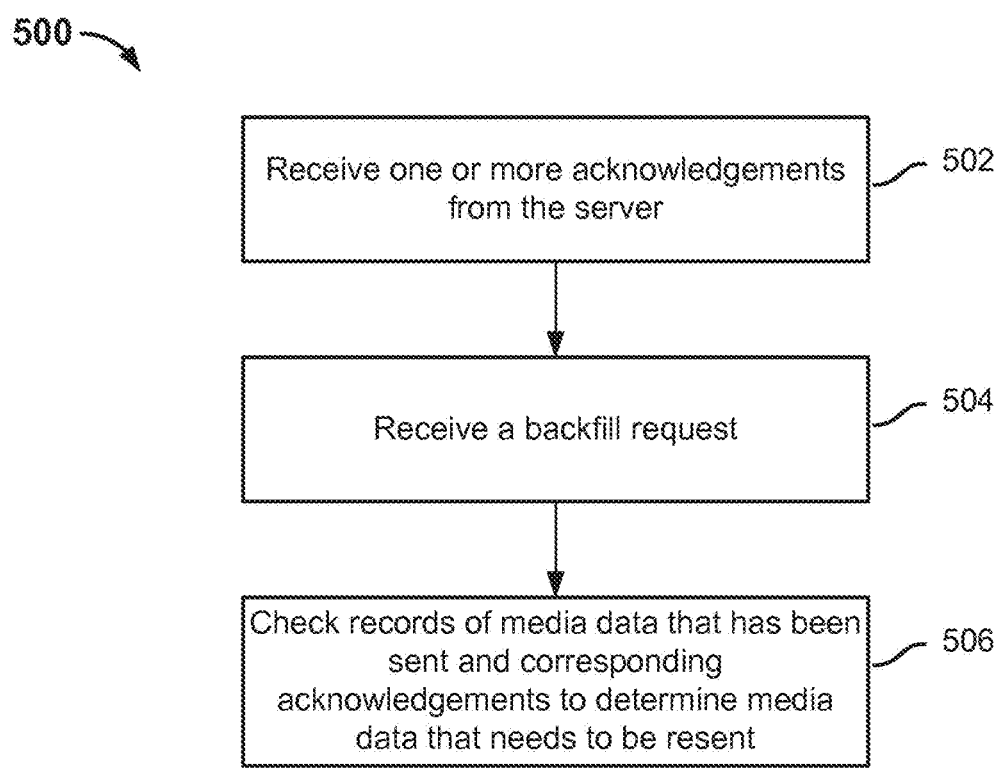
FIG. 5 is a flowchart illustrating an embodiment of a process for detecting that a portion of the first media data stream needs to be resent.

FIG. 5 is a flowchart illustrating an embodiment of a process for detecting that a portion of the first media data stream needs to be resent. Process 500 can be used to implement 404 of process 400.

In some embodiments, the destination sends acknowledgments to the device upon successfully receiving data in the first media data stream from the device. Depending on the communication protocol used between the device and the destination, the acknowledgments can have different formats and the interval at which the acknowledgements are sent can differ. For example, in some embodiments, the device sends data in blocks. Each block comprises a set of media data frames and some identification information e.g., a block identifier, the range of frame identifiers for the set of media data frames, the range of timestamps associated with the set of media data frames, or any other appropriate information that identifies the block or its contents). Accordingly, the acknowledgement also includes the identification information to indicate that the block or the set of media data frames that is successfully received. At 502, one or more acknowledgements are received from the server.

When the communication channel between the device and the server is interrupted, the server will not receive certain data and therefore will not send acknowledgements with respect to the data. In some embodiments, lower layer (e.g., the TCP layer) software handles the process of reestablishing the connection. Upon being notified that the communication channel has been reestablished, the server sends a backfill request to the device, instructing the device to check for any data that has not been successfully acknowledged and therefore should be resent. At 504, the backfill request from the server is received by the device.

At 506, the device checks its records of media data that has been sent and corresponding acknowledgements to determine which data blocks or data frames have not been acknowledged. For example, if the device has sent media data frames with identifiers ranging from 1-200 to the server but has only received acknowledgements for media data frames 1-150 when the backfill request is received, then the portion that needs to be resent includes frames 151-200, which will be sent in reverse order according to the frame identifiers.

Figure 6:
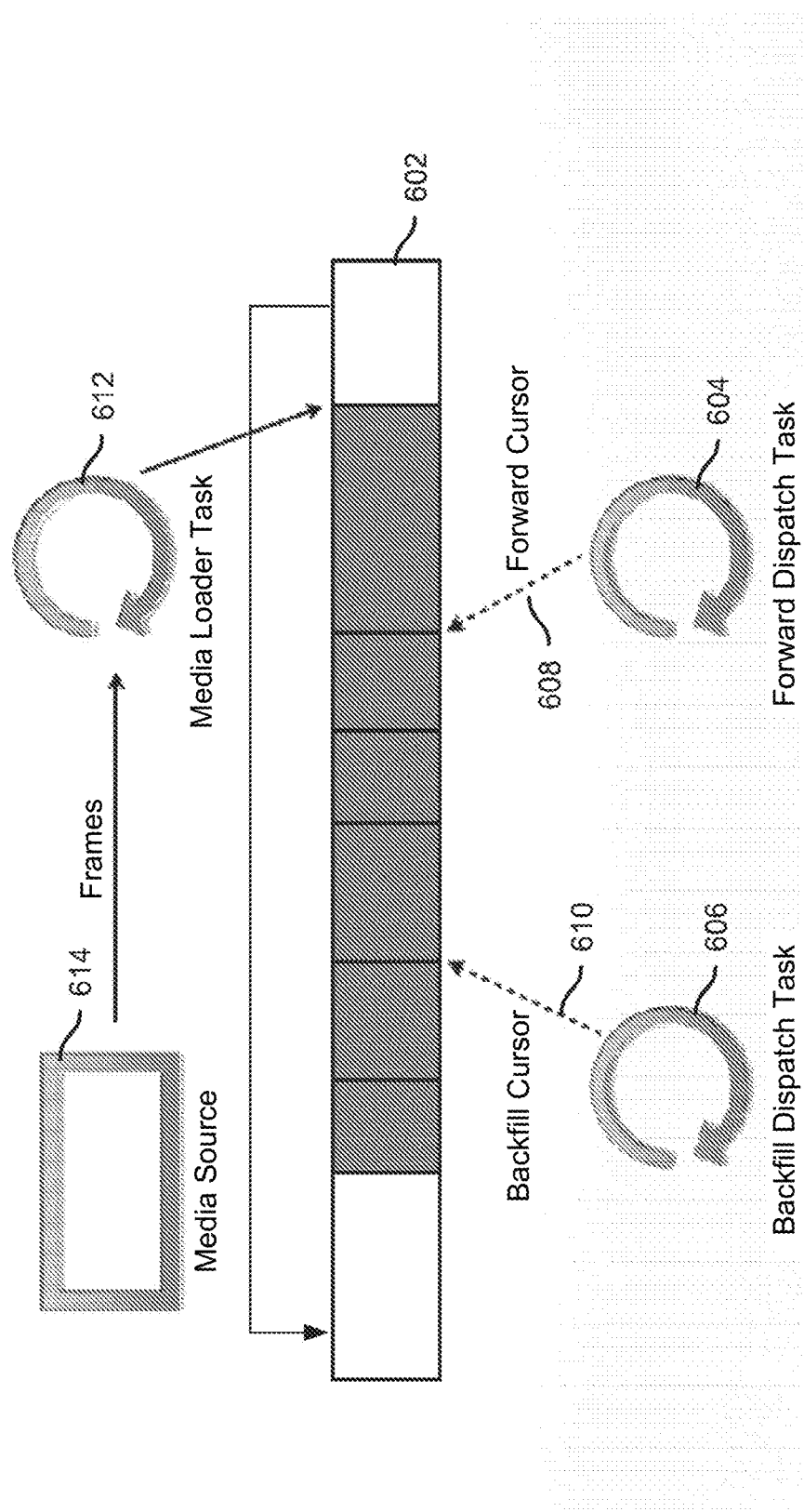
FIG. 6 is a diagram illustrating an example implementation of an embodiment of a media data streaming system.

FIG. 6 is a diagram illustrating an example implementation of an embodiment of a media data streaming system. System 600 implements its local storage buffer using a circular buffer 602. In the example shown, circular buffer 602 is a fixed-sized circular buffer storing non-uniformly sized data chunks (referred to as CircularChunkBuffer). Uniformly sized data chunks can be used in other embodiments. Each data chunk includes a set of frames. As shown, a media loader task 612 (implemented as a thread or a process executing on the processor of the device) retrieves frames from a media source (e.g., the camera interface) and places the frames into circular buffer 602. The direction in which the frames are written is referred to as the forward direction, and the opposite direction is referred to as the backward direction. Since a circular buffer does not have a beginning or an end, as the media loader task continuously writes frames to the circular buffer, old frames can be overwritten by new frames.

Data in circular buffer 602 is dispatched (i.e., transmitted) to the destination by a forward dispatch task 604 and a backfill dispatch task 606. Each task transmits a corresponding media data stream. The forward dispatch task is started as soon as the device is connected to a server, taking media data stored in circular buffer 602 in the forward direction according to time, and transmitting the data to the server. A forward cursor 608 that advances in the forward direction is used to track the position of the media data being transmitted and allow the forward dispatch task to transmit the appropriate media data frame. In some embodiments, once a frame is transmitted by the forward dispatch task, the forward cursor advances to the next frame in the forward direction.

Backfill dispatch task 606 is started when it is detected that a portion of the media data in the first media data stream sent by the forward dispatch task needs to be resent, Backfill dispatch task 606 transmits media data in circular buffer 602 in the backward direction, starting with the last frame that needs to be resent. A backfill cursor 610 that advances in the backward direction is used to track the position of the media data that needs to be resent. In some embodiments, once a frame is transmitted by the backfill dispatch task, the backward cursor advances to the next frame in the backward direction. In the example where frames 151-200 need to be resent, the backfill cursor points to frame 200 initially since frame 200 should be resent first. Once frame 200 is sent, the backfill cursor advances to the next frame 199, then 198, and so on until frame 151 is resent. If, however, certain old frames have been overwritten, then the backfill process stops when the last available frame that needs to be resent is resent. For example, if frames 151 and 152 have been overwritten by new frames 806 and 807, then the backfill cursor stops advancing when frame 153 has been sent and the backfill process is completed.

In some situations, the media data stream comprising backfilled data and the media data stream comprising live data can be transmitted contemporaneously. In some embodiments, the live video stream is given higher priority than the backfilled data stream over the transmission channel. For example, the live video stream will occupy as much bandwidth as needed if the available bandwidth exceeds the bandwidth of the live video stream or all the available bandwidth if the available bandwidth is less than the bandwidth of the live video stream; and buffered data is sent to the server using any remaining bandwidth. Alternatively, the live video stream and the buffered data can be configured to occupy some predefined proportion of the available bandwidth (e.g., the live stream occupies 80% of the bandwidth and the buffered data occupies 20%). In some embodiments, each stream is sent over a different TCP connection, and the TCP connection associated with the live data stream is assigned a higher priority than the TCP connection associated with the backfilled data stream. For example, the live data stream can be configured to "very high" priority and the buffered data can be configured to "medium" priority when their respective TCP connections are opened.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A camera system, comprising:
   one or more processors;
   memory having a limited capacity;
   a camera element configured to continuously capture video data in real-time and store the captured video in the memory;
   a microphone configured to continuously capture audio data in real-time and store the captured audio in the memory; and
   a communication interface;
   wherein the one or more processors are configured to:
      continuously capture video and audio data in real-time via the camera element and the microphone, respectively;
      while capturing the video and audio data in real-time, continuously store the captured video and audio data in the memory having the limited capacity;
      continuously send the continuously captured video and audio data in real-time to a remote server system via the communication interface for storage by the remote server system, wherein the video and audio data stored at the remote server system is subsequently accessible by a client access device; and
      while sending the continuously captured video and audio data in real time to the remote server system:
         determine that a portion of the video and audio data sent to the remote server system was not received by the remote server system, thereby creating a gap in the video and audio data stored at the remote server system and available for access by the client access device; and
         when at least some of the portion is still available in the memory having the limited capacity, resend the at least some of the portion from the memory to the remote server system via the communication interface to fill at least some of the gap.

2. The camera system of claim 1, wherein the client access device is configured to display video and audio data sent from the camera system to the remote server system and stored at the remote server system.

3. The camera system of claim 1, wherein the client access device is configured to display video and audio data sent from the camera system to the client access device in real time via the remote server system.

4. The camera system of claim 1, wherein resending the portion occurs concurrently while continuing to capture video and audio data at the camera element.

5. The camera system of claim 1, wherein resending the portion occurs concurrently while continuing to continuously send the video and audio data in real-time to the remote server system.

6. The camera system of claim 1, wherein segments of the captured audio and video are timestamped, and determining that a portion of the video and audio data sent to the remote server system has not been received by the remote server system includes determining which timestamped segments of the captured audio and video have not been acknowledged by the remote server system.

7. The camera system of claim 1, wherein determining that a portion of the video and audio data sent to the remote server system has not been received by the remote server system includes receiving a backfill request from the remote server system.

8. The camera system of claim 1, wherein data that was stored more recently is resent before data that was stored earlier.

9. The camera system of claim 1, wherein data that was stored earlier is resent before data that was stored more recently.

10. The camera system of claim 1, wherein the camera system comprises the remote server system.

11. A method, comprising:
at a camera system having one or more processors, memory having a limited capacity, a camera element configured to continuously capture video data in real-time and store the captured video in the memory, a microphone configured to continuously capture audio data in real-time and store the captured audio in the memory, and a communication interface:
  continuously capturing video and audio data in real-time via the camera element and the microphone, respectively;
  while capturing the video and audio data in real-time, continuously storing the captured video and audio data in the memory having the limited capacity;
  continuously sending the continuously captured video and audio data in real-time to a remote server system via the communication interface for storage by the remote server system, wherein the video and audio data stored at the remote server system is subsequently accessible by a client access device; and
  while sending the continuously captured video and audio data in real time to the remote server system:
    determining that a portion of the video and audio data sent to the remote server system was not received by the remote server system, thereby creating a gap in the video and audio data stored at the remote server system and available for access by the client access device; and
    when at least some of the portion is still available in the memory having the limited capacity, resending the at least some of the portion from the memory to the remote server system via the communication interface to fill at least some of the gap.

12. The method of claim 11, wherein determining that a portion of the video and audio data sent to the remote server system has not been received by the remote server system includes receiving a backfill request from the remote server system.

13. The method of claim 11, wherein data that was stored more recently is resent before data that was stored earlier.

14. The method of claim 11, further comprising at the remote server system:
  receiving a stream of audio and video from the camera element;
  storing the received stream of audio and video data in memory at the remote server system; and
  providing access to the received audio and video data to the client access device.

15. The method of claim 11, wherein the camera system comprises the remote server system, further comprising:
  receiving by the remote server system a stream of audio and video from the camera element;
  storing the received stream of audio and video data in memory at the remote server system; and
  providing by the remote server system access to the received audio and video data to the client access device.

16. The method of claim 15, further comprising, at the remote server system:
  identifying the gap in the received audio and video; and
  in response to identifying the gap, sending a backfill request to the camera element.

17. A non-transitory computer readable storage medium storing one or more programs configured for execution by a camera system having one or more processors, memory having a limited capacity, a camera element configured to continuously capture video data in real-time and store the captured video in the memory, a microphone configured to continuously capture audio data in real-time and store the captured audio in the memory, and a communication interface, wherein the one or more programs comprise instructions for:
  continuously capturing video and audio data in real-time via the camera element and the microphone, respectively;
  while capturing the video and audio data in real-time, continuously storing the captured video and audio data in the memory having the limited capacity;
  continuously sending the continuously captured video and audio data in real-time to a remote server system via the communication interface for storage by the remote server system, wherein the video and audio data stored at the remote server system is subsequently accessible by a client access device; and
  while sending the continuously captured video and audio data in real time to the remote server system:
    determining that a portion of the video and audio data sent to the remote server system was not received by the remote server system, thereby creating a gap in the video and audio data stored at the remote server system and available for access by the client access device; and
    when at least some of the portion is still available in the memory having the limited capacity, resending the at least some of the portion from the memory to the remote server system via the communication interface to fill at least some of the gap.

18. The computer readable storage medium of claim 17, wherein resending the portion occurs concurrently while continuing to capture video and audio data at the camera element.

19. The computer readable storage medium of claim 17, wherein resending the portion occurs concurrently while continuing to send the video and audio data from the memory to the remote server system.

20. The computer readable storage medium of claim 17, wherein segments of the captured audio and video are timestamped, and determining that a portion of the video and audio data sent to the remote server system was not received by the remote server system includes determining which timestamped segments of the captured audio and video have not been acknowledged by the remote server system.

* * * * *